Jan. 11, 1927.
T. L. RANDALL ET AL
1,613,903
CENTERING DEVICE FOR VENEERING MACHINES
Filed Dec. 27, 1924
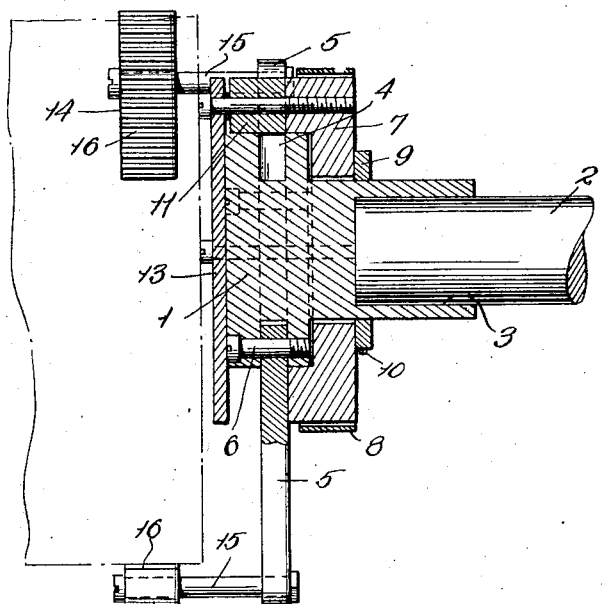
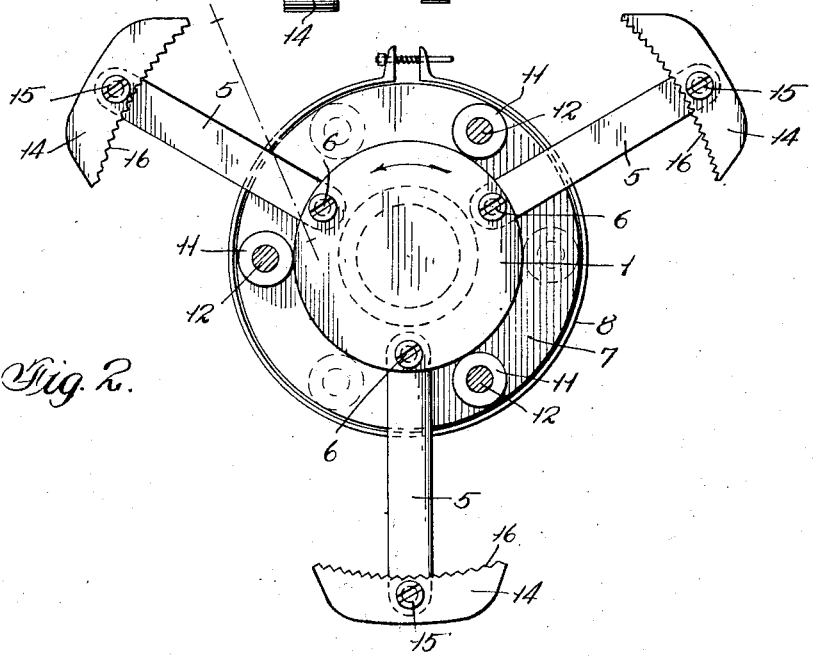

Patented Jan. 11, 1927.

1,613,903

UNITED STATES PATENT OFFICE.

THOMAS L. RANDALL AND JOHN W. RANDALL, OF CONNER, FLORIDA.

CENTERING DEVICE FOR VENEERING MACHINES.

Application filed December 27, 1924. Serial No. 758,388.

The object of our invention is to provide an automatic log centering device which, without preliminary adjustment, is designed to grab and hold a centering log of any diameter within a reasonable range, without the use of tools, and our centering device is of such character that the log may be turned down to an extremely small core whereby a maximum amount of veneer may be cut from the log; and with these objects in view our invention consists of the parts and combination of parts as will be hereinafter more fully set forth.

In the drawings:

Figure 1 is a detail sectional view illustrating our invention, a log being shown in dotted lines.

Figure 2 is a front elevation of our invention.

1 is a dog support or flange which is designed to be connected to a drive shaft 2. In the present embodiments the dog support is shown as being provided with a recess 3 into which the drive shaft is suitably keyed. The dog support or flange 1 is provided, in the embodiment selected to illustrate the invention, with three elongated recesses 4 in which the one end of the dog arm 5 is pivotally mounted on the bolt 6. A brake drum 7 is mounted on the dog support 1 and is provided with a brake band 8 which band may be operated in the manner usual to brake bands of this type. A thrust collar 9 is mounted on the dog support or flange 1 at the juncture between the support and brake drum 7, said thrust collar being secured to the support by means of the set screw 10. Rollers 11 are mounted on journals 12 at intervals on the brake drum 7, there being one roller for each dog arm 5. A dog flange or support shield plate 13 covers the end of the support 1 and the rollers 11 and functions as an abutment for the end of the log. Dogs or lugs 14 are mounted on arms 15, which arms in turn are connected to the dog arms 5. The dogs are pivotally mounted and have their lower faces provided with spurs or teeth 16 which are adapted to be embedded in the log. The dogs preferably are placed at 120 degrees apart.

When a log or block is placed in a veneering machine the brake drum 7 is stopped by applying the brake band 8 which causes the dog arms 5 to move into contact with the dog rollers 11, which rollers throw the dog arms 5 on their pivots and cause the lugs 14 to automatically close down evenly upon the log or block, center the log or block and hold it so that it can be turned against the cutting knife. This similar operation of applying the brake is all that is necessary to cause the locking dogs or lugs 14 to grab, center and hold the log before the cutting knife operation, and inasmuch as these lugs 14 grab the log or block near its ends the log or block can be turned down to a minimum core. Timber which has a defect in its center can be veneered by reason of our invention.

As above stated, our improved centering device will grab, hold, and center various sizes of timber within a reasonable range without adjustment and automatically centers the timber or block.

We are aware that changes can be made in the details of construction of our device within the scope of the appended claims.

What we claim is:

A log centering device for veneer machines including a revoluble dog support, a brake drum secured to said support, arms pivotally secured to said support, dogs pivotally secured to said arms, rollers mounted on journals at intervals on the brake drum, there being one roller for each dog arm, said rollers serving as abutments to move the said arms to throw the dogs into engagement with the perimeter of the log and center and hold the log for turning against a cutting knife, and a shield plate carried by the drum and positioned outside of said support.

In testimony whereof we affix our signatures.

THOMAS L. RANDALL.
JOHN W. RANDALL.